United States Patent [19]

Adams

[11] Patent Number: 5,562,589
[45] Date of Patent: Oct. 8, 1996

[54] STABILIZING INORGANIC SUBSTRATES

[76] Inventor: Harold W. Adams, 7 Overlook Dr., Monroe, Conn. 06468

[21] Appl. No.: 453,797

[22] Filed: May 30, 1995

Related U.S. Application Data

[63] Continuation-in-part of Ser. No. 182,071, filed as PCT/US92/06068, Jul. 22, 1992, abandoned, and Ser. No. 989,708, Dec. 14, 1992, Pat. No. 5,347,072, which is a continuation-in-part of Ser. No. 738,866, Aug. 1, 1991, abandoned.

[51] Int. Cl.$^6$ ........................................... B09B 3/00
[52] U.S. Cl. ........................ 588/256; 405/128; 588/201; 588/252
[58] Field of Search ...................... 588/201, 223, 588/224, 249, 252, 256; 71/901; 106/287.32, 503; 405/128, 129

[56] References Cited

U.S. PATENT DOCUMENTS

| | | |
|---|---|---|
| 2,203,881 | 6/1940 | Schwab et al. . |
| 4,004,428 | 1/1977 | Tazawa et al. . |
| 4,026,719 | 5/1977 | Simic ........................................ 106/287 |
| 4,155,654 | 5/1979 | Kennepohl et al. ........................ 366/16 |
| 4,426,458 | 1/1984 | Woodhams ................................ 501/140 |
| 4,574,714 | 3/1986 | Bach et al. ........................... 588/224 X |
| 4,581,442 | 4/1986 | Adams ...................................... 521/528 |
| 4,624,837 | 11/1986 | Baker ...................................... 423/236 |
| 4,781,944 | 11/1988 | Jones ....................................... 427/228 |
| 4,844,815 | 7/1989 | Ader et al. ............................... 210/751 |
| 4,882,067 | 11/1989 | Johnson et al. .......................... 210/751 |
| 4,889,640 | 12/1989 | Stanforth ............................. 405/129 X |
| 4,921,936 | 5/1990 | Adams ...................................... 528/521 |
| 5,347,072 | 9/1994 | Adams ...................................... 588/256 |

FOREIGN PATENT DOCUMENTS 489591  6/1992  European Pat. Off. ............... 588/201

OTHER PUBLICATIONS

Weinwurm, et al, Chem. Abst. 111, 80889 (1989).

Primary Examiner—George A. Suchfield

[57] ABSTRACT

A process for stabilizing a substantially inorganic substrate and inorganic substrates admixed with organic chemicals comprises treating the substrate with sulfur at an elevated temperature thus converting the substrate into a solid, inert product which resists the leaching of metals, metal ions and other inorganic ions originally present in the substrate.

6 Claims, No Drawings

STABILIZING INORGANIC SUBSTRATES

CROSS REFERENCE TO RELATED APPLICATIONS

This application is a continuation-in-part of U.S. application Ser. No. 08/182,071, filed Jan. 14, 1994, now abandoned, as the National Phase of International Application PCT/US/06068, filed Jul. 22, 1992 and of U.S. Ser. No. 07/989,708, filed Dec. 14, 1992, now U.S. Pat. No. 5,347,072; which are continuations-in-part of U.S. application Ser. No. 07/738,866, filed Aug. 1, 1991, now abandoned.

BACKGROUND OF THE INVENTION

1. Field of the Invention

This invention relates to the field of stabilization of inorganic substrates, the prevention of leaching therefrom, and particularly to the stabilization of metals, especially cobalt, metal ions and other inorganic ions in soils which have been contaminated.

2. Description of the Prior Art

Disposal of waste materials or other materials inadvertently contaminated with metals, metal ions and other inorganic ions is extremely difficult and costly. There has been a long felt need for a safe and reliable process to stabilize inorganic substrates, especially soils, to prevent leaching therefrom and to convert the inorganic substrate to a useful or at least, an innocuous material.

Sanforth in U.S. Pat. No. 4,889,640 describes a method for substantially reducing the leachability of lead and cadmium in foundry waste by treatment of the waste with calcium or magnesium carbonate.

U.S. Pat. No. 4,990,404 discloses that a carbon-sulfur polymer produced by the reaction of sulfur vapor with an organic material will bind any metals contained in the organic rendering them insoluble.

Weinwurm, et al. in European Patent Application EP 313,016 (Chem. Abstr. 111, 80889, 1989) describe a method for insolubilizing heavy metals in waste sludge by mixing with a plastic material, e.g. a clay or shale, capable of immobilizing leachable metals, and heat treating to form a stable silicate complex. This procedure involved pyrolysis and calcination in excess of 1000° C.

Ader et al. in U.S. Pat. No. 4,844,815 teach that certain mercury-containing sludges can be rendered non-leachable or stabilized by treatment with sulfur and cement kiln dust. The waste sludges contain 20–35% water, and the patent teaches that sulfur reacts with the caustic to produce $S_x^{-2}$ which, in turn, reacts with mercury salts to form mercury sulfide. There is no suggestion that sulfur alone would render metals and metal ions in soils or sands non-leachable.

Schwab, et al. in U.S. Pat. No. 2,203,881 teach an apparatus for injecting molten sulfur into voids in soil thereby stabilizing the soil. This reference does not suggest that the sulfur mixes with the soil or that leaching of metals or metal ions from soils treated by this process would be prevented.

SUMMARY OF THE INVENTION

This invention provides a method of preventing the leaching of metals, metal ions and other inorganic ions from an inorganic substrate containing metals, metal ions or other inorganic ions and simultaneously converting any organic chemical admixed with said inorganic substrate to an inert carbon-sulfur polymer comprising mixing said inorganic substrate with sufficient sulfur to convert said organic chemicals to an inert carbon-sulfur polymer and to prevent leaching of any metals, metal ions or other inorganic ions contained in said inorganic substrate and heating the mixture at a temperature greater than the melting point of sulfur.

Inorganic substrates may be selected from soil, sand, fly ash or dredgings from waterways. All organic chemicals contained in the inorganic substrate are converted to an inert carbon-sulfur polymer; the process is especially use when the inorganic substrate is contaminated with a thermally stable, toxic substance such as PCB or PCDD.

Additives such as caustic and cement kiln dust are not required in this process. Furthermore, the present process may be conducted under substantially anhydrous conditions.

In another aspect this invention provides a method for stabilizing cobalt ions contained in an organic system which comprises adding 10 to 90% by weight of a silicon dioxide containing material such as soil or sand to said organic system, and treating the resulting mixture at a temperature above the melting point of sulfur with sufficient sulfur to effect stabilization of said cobalt ions. Addition of small amounts of sodium sulfide has been found to improve the stabilization of cobalt ions.

DETAILED DESCRIPTION OF THE INVENTION

"Soil" is herein defined as the superficial unconsolidated part of the mantel of the earth. Soil used for leaching experiments is USEPA Synthetic Soil Matrix (SSM) available from USEPA Releases Control Branch, Risk Reduction Engineering Laboratory, Edison, N.J. 08837.

"Inorganic substrate" is herein defined as a relatively free flowing material of intermediate to small particle size composed of chemical compounds which do not contain appreciable amounts of carbon to carbon bonds and containing at least 10% silicon oxides or silicic acids or salts thereof. Inorganic substrates include, but are not limited to soils, sands, fly ashes, dredgings from waterways, sludges, slags, foundry wastes, mine wastes, chemical wastes, refining wastes, and the like. "Substantially inorganic substrate" is defined as an inorganic substrate containing measurable quantities of, but less than or equal to 10% organic compounds and at least 10% silicon oxides, silicic acids or salts thereof.

"Metals" are herein defined as elements yielding positively charged ions in aqueous solutions of their salts. Metals contemplated by this invention include, but are not limited to Be, Sc, V, Cr, Mn, Co, Ni, Ga, Ge, As, Se, Rb, Sr, Y, Zr, Nb, Mo, Tc, RU, Cd, In, Sn, Sb, Te, Cs, Ba, La, Os, Ir, Hg, Pb, Bi, Po, Ra, U, Pu, and the like. Metals of special interest are those which are known to cause toxic effects when released into the environment; these include As, Cr, Pb, Hg, Cd, Co, Se, Pu, and the like. Radioactive metals and metal ions may also be stabilized by the process of this invention.

"Inorganic ions" other than metal ions include CN, SCN, NCS, $PO_4$, $NO_3$, halides, borates, metal oxide ions, and the like.

"Stabilize" means to convert to a solid, hard, non-flowable mass or a solid, inert particulate material which resists common solvents and retains the materials contained therein when subjected to leaching conditions.

"Non leachability" as used herein is defined as by the United States Environmental Protection Agency (USEPA) in the Federal Register, 55, 26986–26988 (1990) which is herein incorporated by reference.

"Treating with sulfur" as used herein means mixing a substrate with sulfur at ambient or elevated temperature during which mixing sulfur may be either in a solid, liquid or gaseous form and holding the mixture at a temperature above the melting point of sulfur until stabilization is achieved.

This invention involves treating an inorganic substrate which is mixed with organic chemicals and contains metals, metal ions or other inorganic ions with sulfur in liquid or vapor phase at a temperature above the melting point of sulfur thereby rendering the metals, metal ions and other inorganic ions non-leachable as defined by the USEPA and simultaneously converting said organic chemicals to an inert carbon-sulfur polymer. This method is especially useful for treating soil, sand, dredgings from waterways and fly ash from waste-to-energy plants which contain metals, metal ions, other inorganic ions and toxic or hazardous organic chemicals such as polychlorinated biphenyls (PCB) or polychlorinated dibenzodioxane (PCDD). The inorganic substrates are thereby rendered non-leachable and non-hazardous and any organic chemical contained therein is simultaneously converted to an inert carbon-sulfur polymer. See U.S. Pat. No. 4,921,936, the text of which is hereby incorporated by reference. The amount of organic chemicals admixed in the inorganic substrate is not critical and may vary from low parts per million to 50% or more. A worker of ordinary skill will recognize that greater amounts of sulfur will be required as the organic content increases. Sulfur may be combined with the inorganic substrate containing sulfur at ambient or elevated temperatures. The resulting mixture is held at a temperature above the melting point of sulfur, preferably 3000° to 3500° C. for a time sufficient to complete the reaction, usually one hour or less. This process may be batch or continuous. Excess sulfur may be removed from the stabilized product by solvent extraction or volatilization.

This invention also contemplates the stabilization of heavy metals of significance in radioactive waste, an example of which is cobalt. Cobalt often occurs in radioactive waste in organic form or dissolved in organic solvents. I have found that when organic cobalt is reacted with sulfur under the procedures of U.S. Pat. No. 4,921,936 in the vapor phase, although a large part of the cobalt is rendered insoluble, the reaction product will not meet the non-leaching requirements of the EPA.

This present invention now provides a method for stabilizing cobalt ions contained in an organic system which comprises adding 10 to 90% by weight of a silicon dioxide containing material such as soil or sand to said organic system, and treating the resulting mixture at a temperature above the melting point of sulfur with sufficient sulfur to effect stabilization of said cobalt ions. This process is preferably conducted with sulfur in the vapor phase. Contact of the sulfur vapor with the substrate is maintained for a sufficient time to stabilize the cobalt ions and render the product non-leachable as defined by the EPA.

The process of this invention is easily carried out. An inorganic or substantially inorganic substrate or an inorganic substrate mixed with organic chemicals in a relatively finely divided form is mixed with elemental sulfur at ambient or elevated temperature. Particle size of the substrate is not critical and may vary from submicron to five or ten mm; however, it is preferred that at least 10 to 20% of the substrate be composed of particles smaller than two mm. It has been found advantageous to add 1–2% sodium sulfide to the mixture; this permits a shorter reaction time and lower temperature.

The amount of sulfur is not critical, but there must be sufficient sulfur to stabilize and render non-leachable any metals, metal ions or other inorganic ions contained in the substrate as well as to form a carbon-sulfur from any organic material which is present. The ratio of sulfur to substrate is preferably in the range of 1/10 to 1/1 with a more preferred ratio being 1/3. This process will convert any organic material to an inert carbon-sulfur polymer and prevent the leaching of individual metals, metal ions or other inorganic ions alone or in combination. The amount of metals, metal ions and other inorganic ions is not critical and may range from the detectable limit to several percent in total. Likewise, the amount of organic chemicals present is not critical and may vary from 10 to 90% provided that sufficient sulfur is provided to react with the organic component.

The resulting mixture of sulfur and substrate is heated at a temperature above the melting point of sulfur, maintaining the sulfur in liquid or vapor phase for a sufficient time to effect stabilization of the substrate. Stirring or shaking of the reactants may be employed to speed the reaction, but is not essential. Operable temperatures range from 115°–1500° C.; the preferred conditions are at temperatures of about 350° to 600° C. The worker of ordinary skill will be able to determine the optimum amount of sulfur and the time and temperature of his reaction with minimal experimentation.

Alternatively, the substrate may be combined directly with sulfur at the selected reaction temperature in either a batch or continuous process. If sulfur vapor is used, it may be desirable to employ an inert carrier gas such as nitrogen, carbon dioxide or superheated steam. Alternatively, the reaction may be run at a temperature above the boiling point of sulfur while containing the sulfur vapor within a pressure vessel.

In typical runs with soil or sand as substrates, the products contain 1.2–3% sulfur associated with the inorganic substrate which cannot be removed by extraction or vaporization. The exact molecular formulae of these products is not known at the present time, nor is the mechanism of reaction known to be chemical or physical.

The following examples are provided solely for the purposes of illustration and do not limit the scope of the invention which is defined by the claims.

EXAMPLE 1

Composition and Properties of SSM Soil

The following components were incorporated to produce SSM soil;

| Soil Component | Volume % | Weight % |
| --- | --- | --- |
| Sand | 20.0 | 31.4 |
| Gravel (NO. 9) | 5.0 | 5.7 |
| Silt | 25.0 | 28.3 |
| Top Soil | 20.0 | 19.8 |
| Montmorillonite clay | 7.5 | 5.4 |
| Kaolinite Clay | 22.5 | 9.4 |

This soil was found to have a cation exchange capacity of 30.0–34.5; a total organic content of 2.7–3.4 mg/kg; and a pH of 8.0–8.2.

EXAMPLE 2

Stabilization of SSM Soil

A spiked soil sample containing 1000 mg/kg each of $As^{+3}$ (as $As_2O_3$), $Cr^{+6}$ (as $K_2CrO_4$), $Pb^{+2}$ (as $PbSO_4$), and complex cyanide as ferric ferrocyanide was prepared using the SSM soil from Example 1. Fifty grams of the above spiked soil was combined with 50 g sulfur and the resulting mixture was heated at 350° C. in a shaken autoclave for one hour.

The product, which was very hard, was chiseled from the autoclave and extracted with carbon disulfide; approximately 3% sulfur remained in the product after extraction with carbon disulfide.

EXAMPLE 3

Stabilization of SSM Soil with 33% Sulfur

Following the procedure of Example 2, 120 g of spiked soil was reacted with 40 g sulfur. The sample was crushed and extracted with carbon disulfide; approximately 3% sulfur remained in the produce.

EXAMPLE 4

Stabilization-of SSM Soil With Removal of Excess Sulfur

Following the procedure of Example 2, 120 g of SSM spiked soil was reacted with 40 g sulfur. This sample was crushed, extracted with carbon disulfide and annealed at 500° C. for one hour in a tube swept with a nitrogen stream to remove free sulfur. The annealed product was found to contain 1.2% sulfur.

EXAMPLE 5

Analysis of Product for Extractable Metals

The product of Example 3 was analyzed for extractable metal ions and cyanide by the Wadsworth/Alert Laboratories, 450 William Pitt Way, Pittsburgh, Pa. 15238. The following methods were employed:

For arsenic, chromium and lead, SW846 1311 6010; for cyanide, SW846 9012 (SW846-Test Methods for Evaluating Solid Waste, Physical/Chemical Methods, Third Edition, EPA, September 1986, incorporated herein by reference).

Analysis was performed in accordance with USEPA Toxicity Characteristic Leaching Procedure Method 13311 (55 FR 26986).

Under this procedure, the leachate had no detectable arsenic, chromium, lead or cyanide at detection limits of 0.10, 0.01, 0.05 and 2.5 mg/Kg respectively.

EXAMPLE 6

Vapor Phase Run With Organic Cobalt Feed

An organic soluble form of cobalt, cobalt 2-ethyl hexanoate, in Stoddard solvent 180 g, containing 7.4% by weight cobalt was reacted with 553 g of sulfur in a pressure vessel at 506° C. for three hours. Excess sulfur was removed by volatilization. Upon disassembly of the reactor, 154 g of carbon-sulfur polymer was removed. Cobalt content was found to be 3.92%.

Leaching tests of the product are performed by Wadsworth/ALERT Laboratories using the EPA Toxicity Characteristic Leaching Procedure (TCLP). Analysis of the leachate showed that about 4% of the cobalt contained in the sample could be extracted, but this exceeded the target range of 5 ppm cobalt established by EPA.

EXAMPLE 7

Vapor Phase Run With Organic Cobalt and Soil

The procedure of Example 6 was repeated with the exception that 180 g of SSM soil was added to the organic solution of cobalt prior to reaction with sulfur. The leachate obtained from this reaction was found to contain less than 5 ppm cobalt in the TCLP leaching test.

EXAMPLE 7

Vapor Phase Run With Cobaltous Oxide and Soil

The procedure of Example 7 was repeated except that cobaltous oxide (instead of cobalt 2-ethyl hexanoate) was added to the soil along with 2% sodium sulfide. The resulting mixture was heated at 440° C. for 30 minutes. The product from this reaction was found to produce a leachate containing less than 0.1 mg Co/L, thus passing the TCLP leaching test.

Although the invention has been described with regard to its preferred embodiments, which constitute the best mode presently know to the inventor, it should be understood that various changes and modifications as would be obvious to one having ordinary skill in this art may be made without departing from the scope of the invention which is defined by the claims.

I claim:

1. A method of preventing the leaching of metals, metal ions and other inorganic ions from a substantially inorganic substrate containing metals, metal ions or other inorganic ions, and up to 10% organic chemicals and simultaneously converting said organic chemical admixed with said substantially inorganic substrate to an inert carbon-sulfur polymer comprising mixing said substantially inorganic substrate with sufficient sulfur to convert said organic chemicals to an inert carbon-sulfur polymer and to prevent leaching of any metals, metal ions or other inorganic ions contained in said substantially inorganic substrate and heating the mixture at a temperature greater than the melting point of sulfur.

2. The method of claim 1 wherein said substantially inorganic substrate is soil.

3. The method of claim 1 wherein said substantially inorganic substrate is fly ash.

4. The method of claim 1 wherein said substantially inorganic substrate is dredging from waterways.

5. The method of claim 1 wherein said organic chemical is PCB.

6. The method of claim 1 wherein said organic chemical is PCDD.

* * * * *